Jan. 3, 1939.  F. G. GRAVES  2,142,749
TRAILER TONGUE
Filed Nov. 8, 1937  2 Sheets-Sheet 1
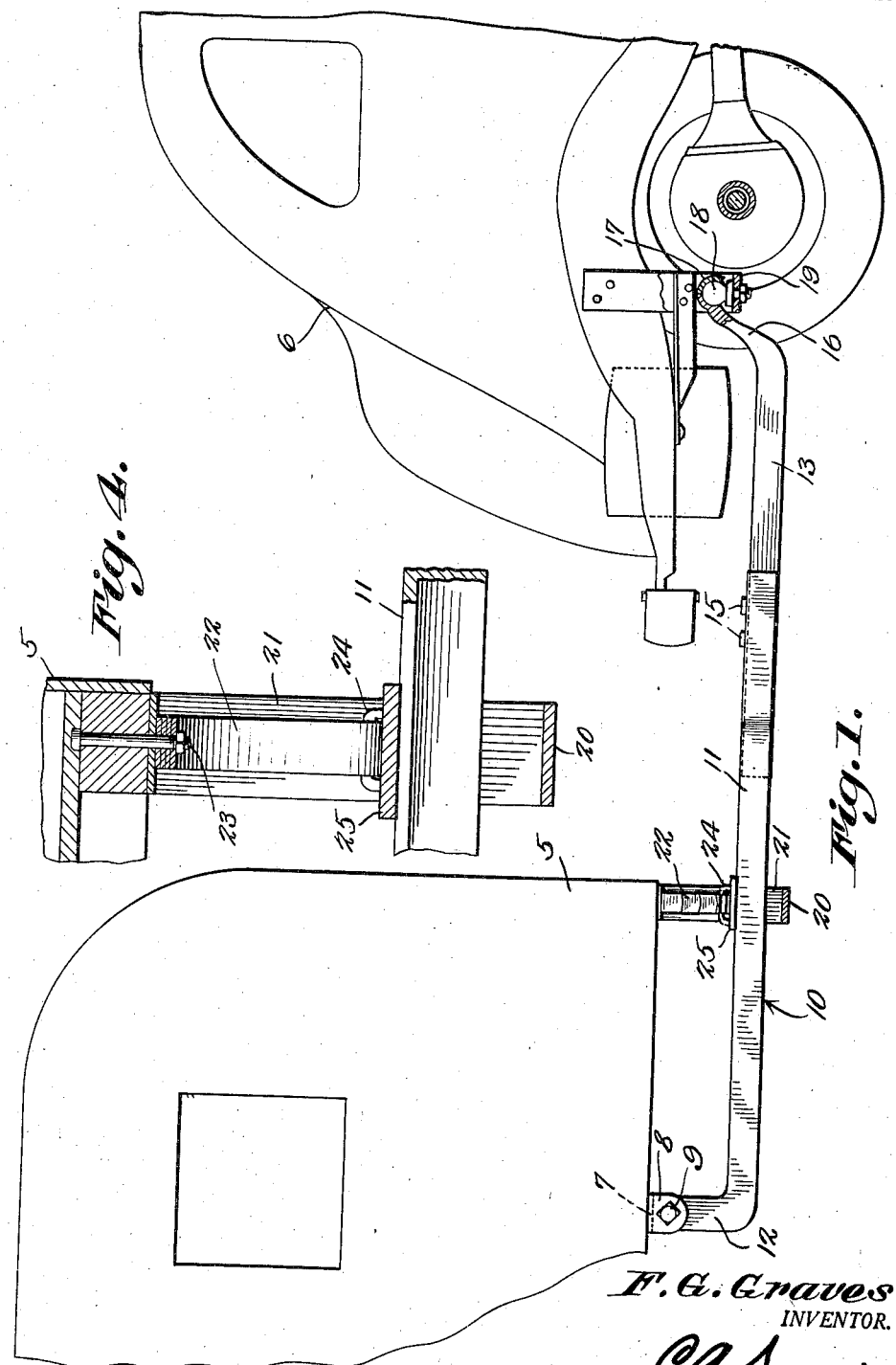
F. G. Graves
INVENTOR.
BY CA Snow Co.
ATTORNEYS.

Jan. 3, 1939. F. G. GRAVES 2,142,749
TRAILER TONGUE
Filed Nov. 8, 1937 2 Sheets-Sheet 2
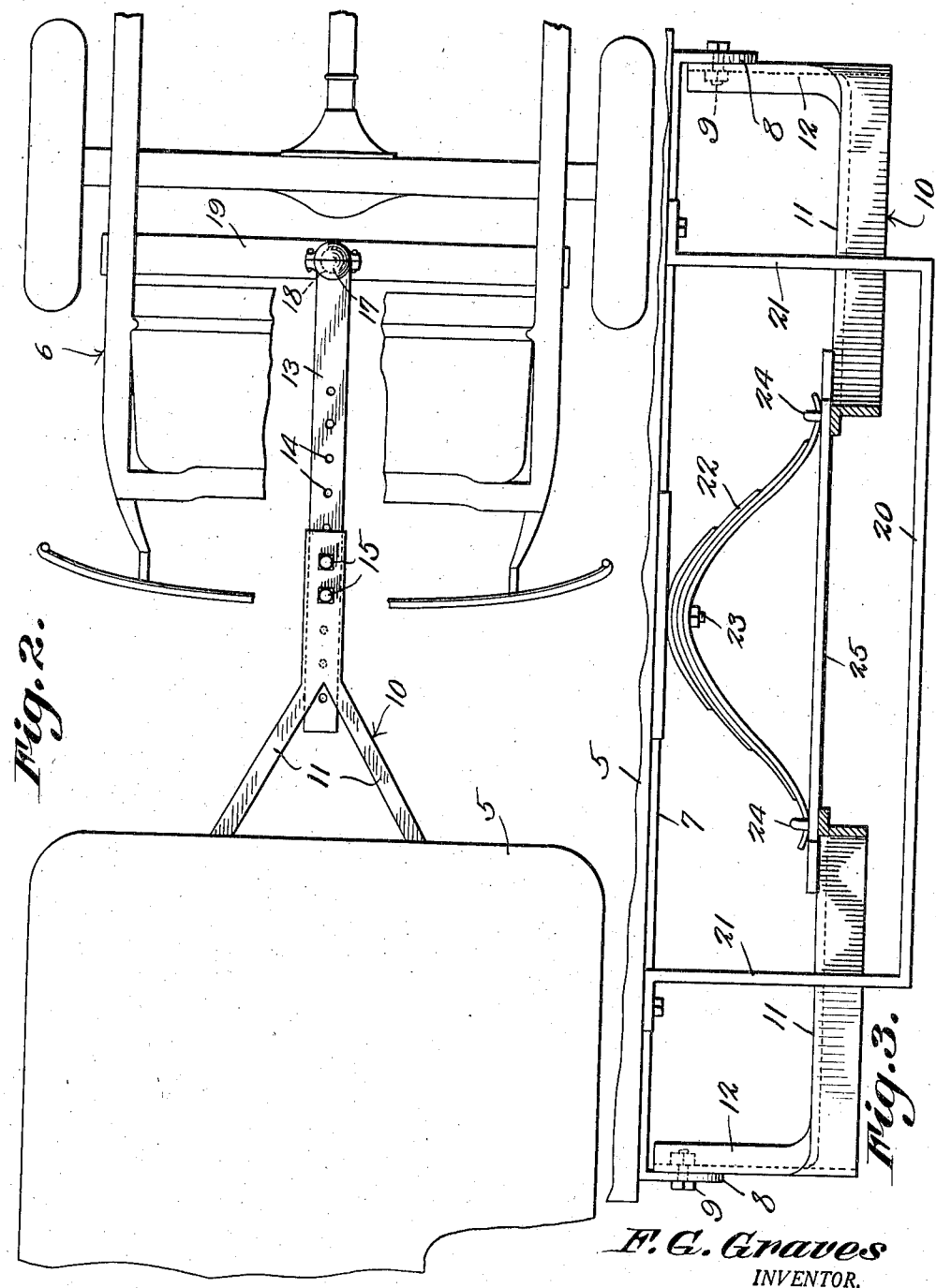
F. G. Graves
INVENTOR.
BY CA Snow Leo.
ATTORNEYS.

Patented Jan. 3, 1939

2,142,749

UNITED STATES PATENT OFFICE 2,142,749

TRAILER TONGUE

Forrest G. Graves, McCook, Nebr.

Application November 8, 1937, Serial No. 173,481

1 Claim. (Cl. 280—33.44)

This invention relates to trailer tongue construction, the primary object of the invention being to provide a trailer tongue having means for yieldingly restricting vertical movement of the tongue with respect to the trailer body, or vice versa, thereby enhancing the riding qualities of the trailer.

An important object of the invention is to provide a device of this character which may be readily and easily mounted without the necessity of altering the usual trailer construction.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view illustrating the trailer hitched to a towing vehicle by means of a trailer tongue, constructed in accordance with the invention.

Figure 2 is a plan view thereof.

Figure 3 is a transverse sectional view taken at a point adjacent to the leaf spring, forming a part of the invention.

Figure 4 is a vertical sectional view through the trailer tongue, illustrating the manner of securing the leaf spring of the tongue, to the body of the trailer.

Referring to the drawings in detail, the reference character 5 designates a trailer, and the reference character 6 designates the motor vehicle to which the trailer is attached, by means of the tongue and hitch, forming the subject matter of the invention.

The reference character 7 designates a bar which is secured to the bottom of the trailer 5, at a point an appreciable distance from the front end of the trailer, as clearly shown by Figure 1 of the drawings.

The ends of the bar 7 are bent downwardly as at 8, providing ears which are formed with openings to receive the bolts 9 by means of which the rear section of the trailer tongue, is pivotally secured to the trailer.

The rear section of the trailer tongue is indicated by the reference character 10 and comprises diverging arms 11 having upwardly extended end portions 12 that are disposed adjacent to the downwardly extended end portions 8, to receive the bolts 9. The forward end of the rear section is constructed of channel bar material, the open side thereof being disposed downwardly, the flanges of the channel bar material being spaced apart a distance to accommodate the bar 13 providing the forward section of the tongue. Openings 14 are formed in the forward section 13 and accommodate the bolts 15 that pass through openings in the forward end of the rear section, securing the forward and rear sections of the trailer tongue together in such a way that the forward section may be adjusted with respect to the rear section. The front end of the forward section extends upwardly as at 16 where it is provided with a socket member 17 of separable construction, so that it may be positioned over the ball 18 carried by the bar 19 that in turn is secured to the side rails of the chassis of the towing vehicle, as clearly shown by Figure 2 of the drawings.

The reference character 20 designates a guide bar that has upwardly extended ends 21 bolted to the bottom of the trailer 5, at a point adjacent to the front end of the trailer, the construction of the main portion of the guide bar is such that it will be spaced an appreciable distance from the trailer tongue, so that the trailer tongue may move vertically within the guide bar.

The reference character 22 designates a leaf spring which is bolted to the bottom of the trailer, by means of the bolt 23 disposed intermediate the ends of the spring, the free ends of the spring being movably held under the U-shaped spring clips 24 that are secured to the bar 25 that in turn is secured to the diverging arms 11, connecting the arms 11.

Thus it will be seen that due to the construction shown and described, the body portion of the trailer may move downwardly against the action of the spring 22, or the tongue, particularly the rear section thereof may move upwardly against the action of the spring 22, absorbing shocks and jars, caused by the trailer moving over irregular road surfaces.

I claim:

A trailer tongue embodying front and rear sections adjustable with respect to each other, diverging arms forming a part of the rear section, upwardly extended portions on the diverging arms, means for pivotally connecting the upwardly extended end portions to the trailer, a leaf spring connected with a trailer at a point intermediate the spring, a bar connecting the diverging arms, clips extending upwardly from said bar and under which the free ends of the leaf spring extend, the ends of said spring adapted to slide under the clips upon vertical movement of the spring, and means for securing the forward section of the trailer tongue to a towing car.

FORREST G. GRAVES.